United States Patent Office
3,726,775
Patented Apr. 10, 1973

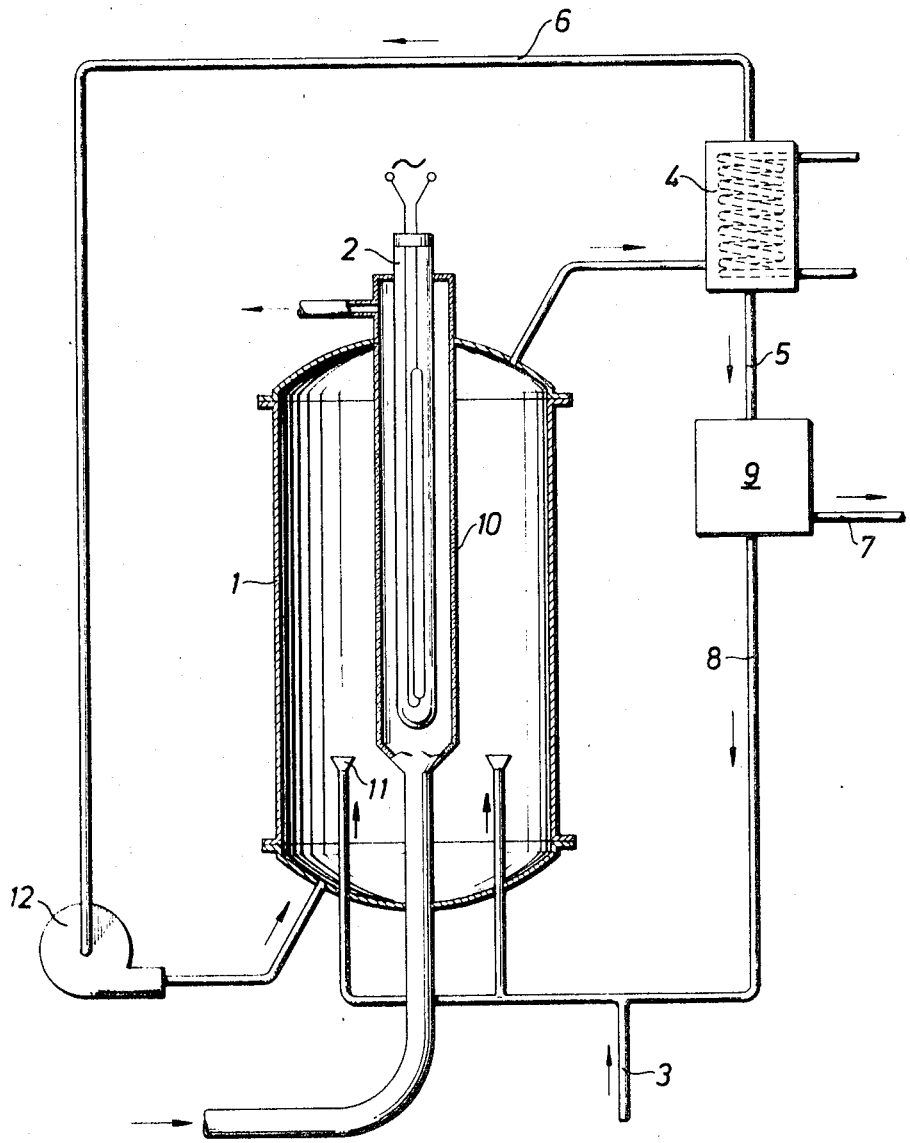

3,726,775
**METHOD OF MANUFACTURING TRICHLORO-
ACETYL CHLORIDE**
Jan Anders Dahlberg, Anders Olof Modén, and Carl
Arne Gunnar Östlund, Skoghall, Sweden, assignors to
Uddeholms Aktiebolag, Uddeholm, Sweden
No Drawing. Filed Feb. 22, 1971, Ser. No. 117,243
Claims priority, application Sweden, July 9, 1970,
9,569/70
Int. Cl. B01j 1/10
U.S. Cl. 204—158 R         12 Claims

ABSTRACT OF THE DISCLOSURE

Trichloroacetyl chloride is produced from perchloroethylene, oxygen and chlorine in a photochemical chlorine-sensitized gas phase oxidation process. A liquid coolant is continuously introduced into the reactor in drop form, to absorb by vaporization a considerable portion of the heat produced in the oxidation process.

---

The invention relates to a method of manufacturing trichloroacetyl chloride by means of the photochemical chlorine-sensitized gas phase oxidation of perchloroethylene with oxygen, the perchloroethylene, the oxygen gas and the chlorine being introduced continuously into a reactor and being irradiated with actinic light to form trichloroacetyl chloride.

According to patent literature, trichloroacetic acid (TCA) can be industrially manufactured in many different ways, for example by chlorinating acetic acid, by oxidation of chloral with nitric acid or by oxidation of perchloroethylene and hydrolysis of the acid chloride formed. The most usual of these processes is probably the first one. However, this method has several weaknesses: the reaction speed is rather low towards the end of the chlorination process, and the product will therefore contain relatively high percentages of monochloro and dichloro acetic acid. Also, from the raw material point of view, the method is out of date since at least half of the amount of chlorine added is lost or results in low-value hydrogen chloride. The objection can also be directed against the oxidation of chloral, that it is too expensive from the raw material point of view. However, since perchloroethylene can now be manufactured by oxychlorination of ethylene, this chemical has become an attractive raw material from the economic point of view, for the manufacture of trichloroacetyl compounds. This is immediately clear from the following formulas for oxychlorination of ethylene and oxidation of perchloroethylene:

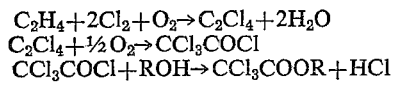

$$C_2H_4 + 2Cl_2 + O_2 \rightarrow C_2Cl_4 + 2H_2O$$
$$C_2Cl_4 + \tfrac{1}{2} O_2 \rightarrow CCl_3COCl$$
$$CCl_3COCl + ROH \rightarrow CCl_3COOR + HCl$$

In theory, therefore, this method gives a chlorine yield of 75% to trichloroacetic acid. In practice, however, the method as carried out in accordance with known practice has several weaknesses which make it less of a competitive force. The most important of these weaknesses is probably the particularly low reaction speed of the photochemical oxidation with oxygen. Various attempts have been made to increase the reaction speed, for example by sensitizing with chlorine or sulphur trioxide by the addition of organic peroxides, and by changing to a more expensive oxidation agent, such as nitric acid. However, irrespective of the precautions taken, the reaction has required many hours before being more or less complete. Another weakness is the side reaction which produces phosgene and reduces the yield of trichloroacetyl chloride (TCAC) calculated on the perchloroethylene consumed, by about 15% usually. Yet another drawback is the hexachloroethane which is always produced to a varying degree.

The object of the present invention is to eliminate or substantially reduce these drawbacks.

In scientific experiments it has been found that the chlorine-sensitized photo-oxidation of perchloroethylene gives considerably greater yield in gas phase than in liquid phase. The reason that it has been impossible to make use of this fact to increase the reaction speed to acceptable values in an industrial process is that the reaction is strongly exothermic, and that too high a temperature cannot be permitted because of the side reactions which then occur. The difficulty of removing the heat from the gaseous product has meant that so far it has only been possible to carry out the process successfully on a very small scale, as pointed out in German Pat. No. 759,963.

According to our invention it is now possible to carry out the oxidation in gas phase under well controlled temperature conditions.

The method according to the invention is characterised in that a liquid coolant is continuously introduced into the reactor in drop form, which by vaporization takes care of a considerable portion of the heat liberated during the oxidation. The coolant may consist of perchloroethylene which is added in excess. Instead of an excess of perchloroethylene a corresponding quantity of trichloroacetyl chloride, or a coolant which is substantially inert under the reaction conditions, for example carbon tetrachloride or pentachloroethane, may be mixed with the perchloroethylene fed in.

In carrying out the method according to the invention, it has been found, surprisingly, that the reaction speed seems to be substantially independent of the percentage of perchloroethylene in the liquid sprayed into the reactor. In other words, the reaction can be carried to a percentage of trichloroacetyl chloride above 90% without the reaction speed decreasing noticeably. It has also, unexpectedly, been found that the reaction according to the invention results in smaller quantities of phosgene and hexachloroethane than in previously known processes for the manufacture of trichloroacetyl chloride.

In order to achieve good contact between the liquid to be vaporized and the reacting gas mixture, the liquid is introduced through a spray nozzle, together with the quantity of oxygen necessary for the oxidation. The nozzle is placed so that the spray mist is directed towards the most brightly lit part of the reactor. Several spray nozzles may possibly be used. The lamp or lamps should be cooled with a coolant which is kept approximately at the reaction temperature, so that condensation of perchloroethylene, TCAC, or other cooling liquid is avoided in the reactor. The cooling sheath of the lamp may suitably be made of borosilicate glass. Short-wave ultraviolet radiation ($\lambda < 3000$ A.) is thus prevented from being absorbed by the reaction product to start further oxidation to phosgene. It has been found that undesirable side reactions (formation of hexa-chloroethane and phosgene) are favoured by temperatures above 100° C., and for this reason the reaction temperature should be kept below this value. Both perchloroethylene and trichloroacetyl chloride boil, at normal pressure, in the region of 120° C. In order to avoid having to carry out the reaction under partial vacuum, therefore, a carrier gas for the vaporized substances must be supplied to the reactor. This carrier gas leads the perchloroethylene and trichloroacetyl chloride fumes to a condenser, and is then recirculated to the reactor. The carrier gas is suitably oxygen or air. The chlorine gas necessary for the absorption of light is added to the reactor either separately or mixed with the oxygen necessary for the reaction. Alternatively, the chlorine can be introduced with the circulating carrier gas. Chlorine disappears from the circulating gas phase partly due to the formation of hexa-chloroethane, partly by dissolving in the condensed reaction product, and partly with the small amount of circulating gas which must be removed in order to keep the phosgene content in the circulating gas under control. A substantial proportion of the phosgene gas produced is also removed with the condensate, from which it is removed by stripping with air.

The required excess quantity of perchloroethylene, or the quantity of coolant which must be mixed into the perchloroethylene, is principally determined by the ratio between the heat of reaction and the heat of evaporation of the perchloroethylene or coolant, respectively. Since the heat of evaporation is approximately 8–9 Kcal./mol, whereas the enthalpy alteration upon oxidation of perchloroethylene to TCAP is approximately —77 Kcal./mol, it is obvious that the maximum excess necessary of perchloroethylene, trichloroacetyl chloride or other coolant is about ten times the quantity of perchloroethylene to be oxidized. In most cases a much less quantity is sufficient. The circulating carrier gas, which is cooled in the condenser, contributes quite a considerable extent to the cooling effect, upon its re-entry into the reactor. Since the reaction temperature virtually determines the lowest rate at which the carrier must be supplied to the reactor (it can only take with it as much vapour from the reactor as is determined by the saturation pressure for perchloroethylene and trichloroacetyl chloride), the quantity of perchloroethylene and trichloroacetyl chloride, respectively, will be determined to a great extent by the reaction temperature. If the temperature drops, the need for an excess of perchloroethylene or other coolant will also decrease. It is preferred to operate with such a reaction temperature, and with the rate of the carrier gas adjusted so that the quantity of liquid vaporized is at the most six times and at the least twice as great (calculated in mol) as the quantity of perchloroethylene which is oxidized.

It is preferred that the oxygen is added in an excess, preferably 0.5–1 mol of oxygen per mol trichloroacetyl chloride formed in the reaction. The excess of oxygen may be recirculated, as will be apparent from the accompanying drawing.

The amount of chlorine required for sensitizing is substantially determined by the desired absorption of light and by the dimensions of the vessel. In a reactor where the path of the light is at least 10 to 15 cm., it has been found that the active light from a mercury vapour lamp is absorbed to an acceptable extent if the partial pressure of the chlorine in the circulating carrier gas is 25–30 mm. Hg. If the dimensions of the reactor are increased the percentage of chloride gas can advantageously be lowered even as low as to below 25 mm. Hg. This has, inter alia, the favourable effect that the formation of hexa-chloroethane decreases. Calculated in the quantity of oxygen gas used, a continuous addition of 2–10 mol percent chlorine, is necessary, preferably 3–7 mol percent.

The method can be carried out in the apparatus according to the drawing. An elongated mercury vapour lamp 2 is arranged coaxially in a cylindrical reactor 1. The lamp is cooled by a cooling sheath or jacket 10 of an ultra-violet light transparent material. A coolant is passed through the cooling jacket. Perchloroethylene is supplied through a conduit 3 and sprayed in the form of drops into the reactor by means of spray nozzles 11. The oxygen and the quantity of chlorine necessary for the sensitizing are also supplied through the conduit 3. The gaseous reaction product flows to a cooler 4 where the trichloroacetyl chloride formed and the excess perchloroethylene condense. The gas which is not condensed in the cooler 4, principally oxygen, is returned to the reactor 1 through a conduit 6 containing a pump 12. The condensate is withdrawn through a conduit 5 to an apparatus 9 in which the trichloroacetyl chloride is made to react with water to form trichloroacetic acid and hydrogen chloride, and where the trichloroacetic acid is separated from the perchloroethylene by means of distillation or extraction, for example. The product is removed through a conduit 7. The perchloroethylene is withdrawn through a conduit 8 and is returned to the reactor through the spray nozzles 11. An excess of perchloroethylene, suitably 2–6 times the theoretical quantity, will therefore be sprayed into the reactor. The vaporization of this excess keeps the reaction temperature down, suitably at about 50–90° C.

EXAMPLE 1

127 litres oxygen gas and 4233 grams perchloroethylene per hour were introduced through a spray nozzle into the bottom of a reactor consisting of a ten-litre round-bottomed flask having a centrally placed water-cooled 80 w. mercury vapour lamp as light source. The gaseous reaction product was passed to a cooler where TCAC formed and unreacted perchloroethylene were condensed. Together with the uncondensable gases (principally oxygen) which were circulated at a rate of 8400 litres/hour, 7.0 litres chlorine gas was introduced per hour. The temperature of the gases entering the reactor was about 20° C. A small portion of the reaction product left the reactor in liquid form through an outlet at the bottom and was added to the condensate from the cooler. The resulting product mixture had the following composition: TCAC 21.7%, phosgen 2.7%, hexa-chloroethane 0.76%, perchloroethylene epoxide 0.09% and chlorine 0.2%. The remainder consisted of unreacted perchloroethylene. In order to keep the phosgene content in circulating gas under control, about 30 litres gas per hour was continuously removed from the circulation system immediately after the condenser. By analysis of the purge gas and the reaction product, 99% of the perchloroethylene used could be accounted for in the form of $C_2Cl_4$, $CCl_3COCl$, $COCl_2$ and $C_2Cl_6$. The yield (calculated on the converted perchloroethylene) was: TCAC 86.1%, phosgene 11.6% and hexa-chloroethane 2.3%. The temperature in the reactor was 87° C.

EXAMPLE 2

A mixture of 39.1% TCAC, 1.6% hexa and 59.3% perchloroethylene was introduced into the reactor described in Example 1 at a rate of 4512 grams/hour. At the same time 127 litres oxygen and 7.1 litres chlorine were added per hour. Otherwise the experiment was carried out in the same manner as that described above. The resulting product mixture contained 57.5% TCAC, 1.04% phosgene, 1.5% hexa-chloroethane, a small quantity of chlorine and the remainder perchloroethylene. Over 99.5% of the perchloroethylene used could be accounted for. The yield (of converted perchloroethylene) was: for TCAC 94%, for phosgene 6% and for hexa-chloroethane 0%. The temperature during the experiment was 83° C.

EXAMPLE 3

A mixture consisting of 74.4% TCAC, 0.56% hexa-chloroethane and the remainder perchloroethylene was introduced into the reactor described in Example 1 at a rate of 4425 grams per hour. At the same time 127 litres oxygen and 7.2 litres chlorine were added per hour. In other respects the experiment was performed in the same way as that described above. The resulting product mixture contained 91.7% TCAC, 1.5% phosgene, 0.59% hexachloroethane, approximately 6% perchloroethylene and small quantities of chlorine. 98% of the perchloroethylene used could be accounted for. The yield (of converted perchloroethylene) was: for TCAC 90.2%, for phosgene 9.7% and for hexa-chloroethane 0.1%. The temperature during the experiment was 78.5° C.

What is claimed is:

1. Method for manufacturing trichloroacetyl chloride by means of the photochemical chlorine-sensitized gas phase oxidation of perchloroethylene with oxygen, the perchloroethylene, the oxygen gas and the chlorine being introduced continuously into a reactor and irradiated in gaseous form with actinic light to form trichloroacetyl chloride, characterised in that a liquid coolant is continuously introduced into the reactor in drop form, which by vaporization absorbs a considerable portion of the heat liberated during the oxidation, and wherein the reaction temperature is not greater than about 100° C.

2. Method according to claim 1, characterised in that the coolant is added in a quantity of 1–5 mol coolant per mol perchloroethylene.

3. Method according to claim 1, characterised in that the coolant consists of perchloroethylene.

4. Method according to claim 1, characterised in that the coolant consists of trichloroacetyl chloride.

5. Method according to claim 1, characterised in that the coolant consists of a mixture of perchloroethylene and trichloroacetyl chloride.

6. Method according to claim 1, characterised in that the coolant consists of carbon tetrachloride.

7. Method according to claim 1, characterised in that the coolant consists of pentachloroethane.

8. Method according to claim 1, characterised in that the coolant consists of a volatile fluorochloralkane.

9. Method according to claim 1, characterised in that the reaction product and the coolant are condensed in a cooler, from which the uncondensed cooled gas is recirculated to the reactor.

10. Method according to claim 1, characterised in that the reaction temperature is in the range from about 50–90° C.

11. Method according to claim 1, characterised in that the quantity of chlorine used as 2–10 mol percent of the added oxygen gas quantity.

12. In the method of producing trichloroacetyl chloride by continuously exposing a gaseous mixture of perchloroethylene, oxygen and chlorine to actinic light at an elevated temperature to produce a chlorine-sensitized photochemical oxidation of perchloroethylene, the improvement comprising adding an atomized mixture of perchloroethylene and a coolant to the reaction zone, the atomized perchloroethylene being evaporated to produce the gaseous perchloroethylene required for the reaction, the atomized coolant being evaporated to maintain a reaction temperature of 50–90° C.

References Cited

UNITED STATES PATENTS

| 2,321,823 | 6/1943 | Kirkbride | 204—158 R |
| 2,736,695 | 2/1956 | Calfee et al. | 204—158 R |

HOWARD S. WILLIAMS, Primary Examiner

U.S. Cl. X.R.

201—193; 250—43